June 3, 1969  TOSHIO KASAHARA  3,447,986
METHOD OF JOINTING SHEATHS OF ALUMINUM-SHEATHED CABLES
Original Filed Nov. 20, 1962

INVENTORS
Toshio Kasahara
By: Paul M. Craig, Jr.
ATTORNEY

INVENTORS
Toshio Kasahara

By: Paul M. Craig, Jr.
ATTORNEY

United States Patent Office 3,447,986
Patented June 3, 1969

3,447,986
METHOD OF JOINTING SHEATHS OF ALUMINUM-SHEATHED CABLES
Toshio Kasahara, Odawara-shi, Japan, assignor to Showa Electric Wire and Cable Co., Ltd., Kawasaki-shi, Japan
Continuation of application Ser. No. 238,894, Nov. 20, 1962. This application Jan. 20, 1967, Ser. No. 610,716
Claims priority, application Japan, Nov. 25, 1961, 36/42,055; Apr. 21, 1962, 37/15,489; Sept. 28, 1962, 37/41,879
Int. Cl. H01r 43/00; H02g 1/14
U.S. Cl. 156—49          10 Claims This application is a continuation of Ser. No. 238,894 filed Nov. 20, 1962 and now abandoned.

The present invention relates to methods of jointing sheaths of aluminum-sheathed cables and is intended to provide an improved method of jointing such sheaths to a sleeve therefor of a junction box or other electrical device comprising the steps of wrapping the end portion of the aluminum sheath of cables to be jointed with a metal tape previously coated with a cold-setting synthetic resin adhesive material or while coating the tape with such adhesive material to form a composite adhesive layer, fitting said sleeve over the periphery of the composite adhesive layer followed, if desired, by contracting said sleeve, and subsequently allowing said synthetic resin adhesive material to harden.

In securing sheathed cables to a junction box or other electrical device, it is usual practice to joint cable sheaths in gas- and liquid-tight fashion after the cores of the cables have been spliced. This is for the purpose of keeping the cables and the electrical device connected thereto from mechanical failure while at the same time preventing entry of the exterior atmosphere and rainwater therein. Where the cables and the electric device connected thereto have incorporated therein insulators in fluid form such as gases and insulating oils, the above procedure is also followed for the purpose of preventing such insulating materials from flowing out to deteriorate the insulation characteristics of the equipment.

To joint cable sheaths in gas- and liquid-tight fashion, they are usually inserted into a sleeve therefor arranged in gas- and liquid-tight fashion in the casing of a junction box or other electrical device to which the sheathed cables are to be connected and thus suitably secured in the sleeve in gas- and liquid-tight relation thereto. Most ordinarily, a plating solder including a tin-zinc alloy is applied over the surface of the end portions of the aluminum sheaths or of the terminal portions of the junction box or other electrical device and then a plumbing solder of the tin-lead type is applied between the cable sheaths and the terminals to bond them together.

The joint obtained in this manner is of considerable mechanical strength the connection areas being less likely to deteriorate even in an extended period of use, but still involves some deficiencies.

A first deficiency of this procedure is that it can be successfully performed only by a workman having a considerably high degree of skill and requires an extended working time. A second deficiency is that the jointing work is performed at a considerably high temperature involving the danger of damaging the cable cores. This forms a critical problem particularly with plastic-insulated and other cables having a less heat-resistant insulating layer since there is the danger that the cable cores be burnt or fused. To prevent this, it will be required to place a heat insulator over the surface of cable cores, which results in increase in the number of steps of manufacturing such cables as well as in their cost of manufacture and hence might diminish the practical value of plastic-insulated aluminum-sheathed cables in general.

Various methods have been proposed to joint sheaths of aluminum-sheathed cables by mechanical means but they are all of little practical value because sheath joints made by these methods only have unsatisfactory gas- and liquid-tight properties and cannot be used for any extended time period.

An object of the present invention is to provide a method of jointing sheaths of aluminum-sheathed cables which employs no soldering operation.

Another object of this invention is to provide a method of the character described which requires reduced working time compared with methods heretofore followed.

A further object of this invention is to provide a method of the character described which does not require any high degree of skill.

A still further object of this invention is to provide a simplified method of jointing sheaths of aluminum-sheathed cables which produces sheath joints which are completely gas- and liquid-tight and not susceptible to any deterioration throughout their extended service life.

Yet further object of this invention is to eliminate the need of forming heat-insulating layers on cables having less heat-resistant insulating layers such as plastic-insulated power cables to cut their cost of manufacture.

These and other objects, features and advantages of the present invention will become apparent from the following detailed description when taken in conjunction with the accompanying drawings, in which.

Figure 1:
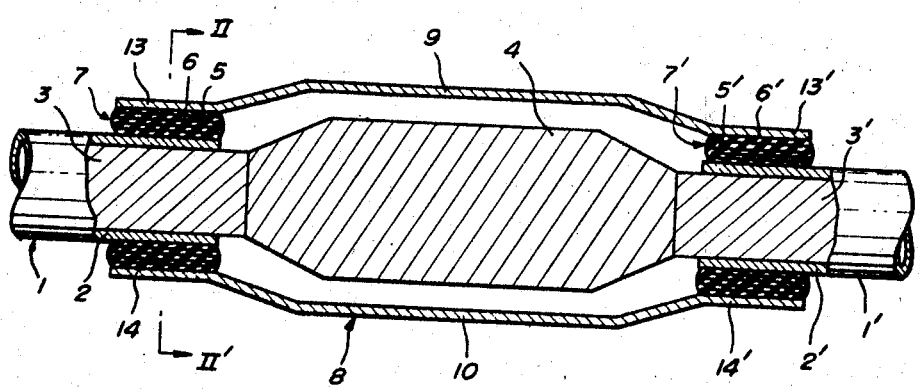
FIG. 1 is an axial cross-sectional view showing one form of joint between aluminum-sheathed cables embodying the present invention.

Description will first be made with particular reference to FIGS. 1 and 2. The cable joint illustrated is formed in the following manner.

At the first, the aluminum sheaths 2, 2' of cables 1, 1' to be jointed are removed adjacent to the end thereof to expose the cable cores 3, 3', which are then spliced in conventional fashion to form a core joint 4.

The end portions of the aluminum sheaths left on the respective cables are then wrapped with metal tapes 6, 6' while the latter are being coated with a cold-setting synthetic resin adhesive, as indicated at 5 and 5', to form respective composite adhesive layers 7 and 7'.

The reference numeral 8 generally designates a junction box including two axially split half sections 9 and 10. The box sections are formed along their opposite longitudinal edges (see FIG. 2) with cooperating flanges 11 and 12 and at opposite axial ends with cooperating half-round sleeve straps 13–13' and 14–14'. The opposiing surfaces of the cooperating flanges and the inner surfaces of the cooperating sleeve straps are coated with the adhesive material and then the box sections 9 and 10 are clamped together by means of bolts 15 and nuts 17, 18 so that the sleeve straps form sleeves embracing the respective cable sheaths 2 and 2' through the intermediary of the adhesive layers 7 and 7', respectively. The adhesive layers are left to cool or heated to harden to complete a cable joint as illustrated.

Figure 3:
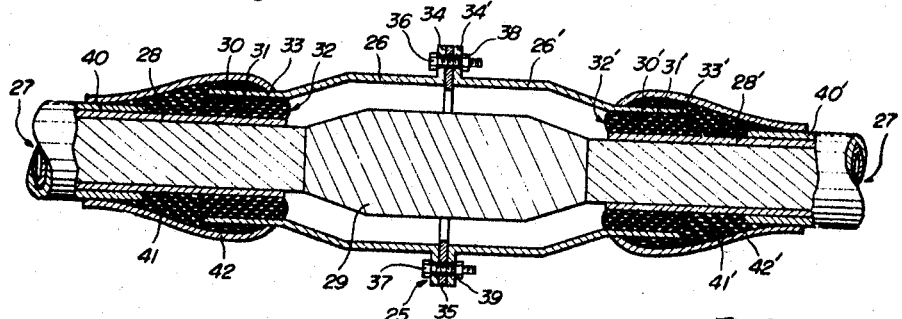
FIG. 3 is a view similar to FIG. 1 showing another form of joint between aluminum-sheathed cables embodying the present invention.

Description will now be made with reference to FIG. 3, which illustrates another practical example of the present invention. In this form of joint a junction box 25 is employed which is divided along a plane normal to the axis thereof into a pair of two half sections 26 and 26'.

The joint illustrated is formed in the following manner. At the first, the aluminum sheaths 28 and 28' of cables 27, 27' to be jointed are removed adjacent to the ends thereof to expose cable cores. The box sections 26 and 26' are then fitted over the respective cable ends and the exposed cable cores are spliced in conventional fashion to form a core joint 29. Metal tapes 31, 31' coated with a cold-setting synthetic resin adhesive material 30, 30' are wrapped about the end portions of the respective aluminum sheaths 28, 28' remaining on the cables 27, 27' to form composite adhesive layers 32 and 32', respectively.

The two box sections 26, 26', each having a sleeve end 33 or 33', are then drawn toward each other so that the sleeve ends 33, 33' are placed over the adhesive layers 32 and 32', respectively, and are clamped together by bolts 36, 37 and nuts 38, 39 with a packing element 35 interposed between opposing annular flanges 34, 34', which are formed on the respective box sections about the periphery of the adjacent ends thereof. In some cases, it is preferable that said packing is preliminarily coated on opposite sides with a suitable adhesive material.

Adhesive layers 41 and 41' are formed about the aluminum sheaths of the respective cables between the sleeves 33, 33' and respective anti-corrosive layers 40, 40' formed about the periphery of the cables 27, 27' and thereafter a self-fusing tape is wrapped about the adhesive layers to form protective layers 42, 42'. A suitable tape may be made by cutting a sheet of a synthetic rubber material such as butyl rubber, cloroprene rubber or the like and mixing the same with a curing agent such as polyisobutylene. The adhesive layers 32, 32', 41, 41' are then allowed to harden to complete the sheath joint.

Figure 4:
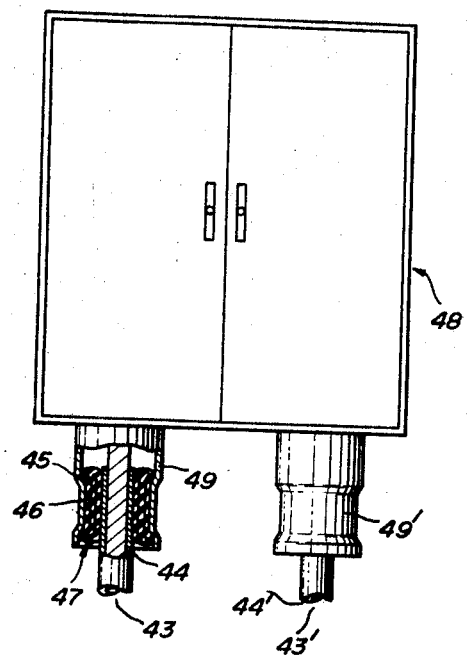
FIG. 4 is a partially cutaway front view showing aluminum-sheathed cables connected to a terminal box by the method of the invention.

Reference is made next to FIG. 4, which illustrates a further embodiment of the invention. At the first, aluminum sheaths 44, 44' are removed from the end portions of cables 43, 43' to be jointed. The end portions of the aluminum sheath remaining on the respective cables are wrapped with a metal tape 46 coated with a cold-setting synthetic resin adhesive material 45 to form a composite adhesive layer 47.

The terminal box 48 is shown as having sleeves 49 and 49', into which the respective cables 43 and 43' are inserted so that said adhesive layers 47 are positioned in the end portions of the respective sleeves 49, 49'.

The end portions of the sleeves 49, 49' are contracted or reduced in diameter by a contractor not shown and then the adhesive layers 47 are allowed to harden to complete the sheath jointing.

Figure 6:
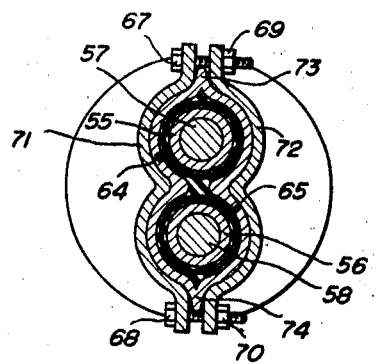
FIG. 6 is a transverse cross-section taken along the line VI–VI' in FIG. 5.
Figure 7:
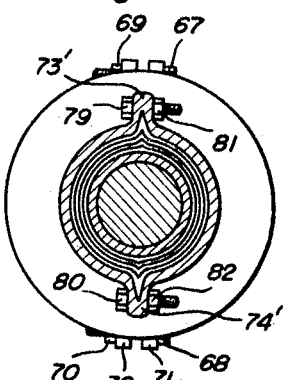
FIG. 7 is a transverse cross-section taken along the line VII–VII' in FIG. 5.
Figure 5:
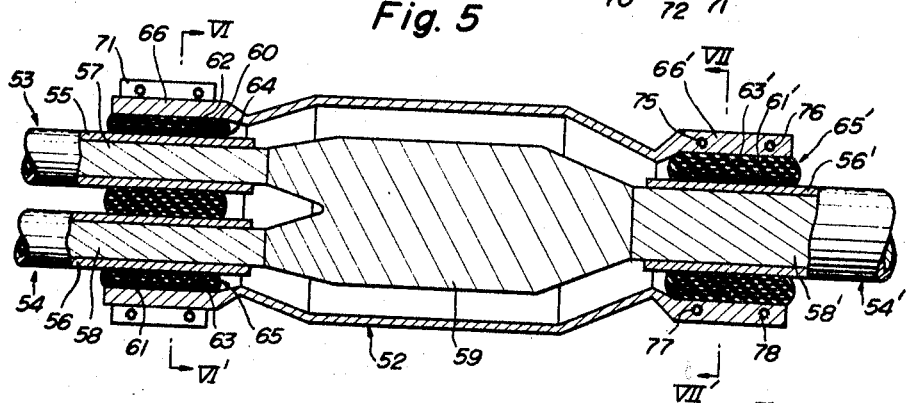
FIG. 5 is an axial cross-sectional view of a dividing joint formed between aluminum-sheathed cables according to the present invention.

In the example shown in FIGS. 5, 6 and 7, a generally cylindrical junction box 52 is employed which is slightly reduced in diameter adjacent to the opposite ends. The joint illustrated may be formed by the following procedure.

At the first, the adjacent end portions of aluminum sheaths 55, 56 and 56' are removed from respective cables 53, 54 and 54', which are to be jointed. The junction box 52 is fitted over the cable 54, or branch cables 53, 54 and then the cores 57, 58 of the branch cables are spliced to the cable core 57' in conventional fashion to form a core joint 59. Metal tapes 62, 63 and 63' coated with a cold-setting synthetic resin adhesive material 60, 61, 61' are wrapped about the end portions of the respective aluminum sheaths 55, 56, 56' remaining on the cables to form composite adhesive layers 64, 65 and 65'

The junction box 52 is then drawn so that the sleeved end portions 66, 66' thereof are positioned over the adhesive layers 64–65 and 65', respectively. The sleeve 66 is collapsed under the clamping force of a contracting attachment including two rigid straps 71, 72 formed so as to force the sleeved end 66 into desired section as they are drawn together by tightening bolts 67, 68 and nuts 69, 70. Any appropriate separate contracting device may also be employed instead of the attachment 71–72. At any rate, the sleeved end 66 of the junction box 52, is desirably collapsed so as to form two outwardly raised ridges 73 and 74 in a plane in which the axes of the two branch cables 53, 54 lie. By doing this, it will be appreciated that the adhesive layers 64 and 65 interposed between the sleeve end 66 and the respective aluminum sheaths 55, 56 are brought into close contact with the latter along the inner cylindrical portions of the layers and that the excess of the synthetic resin adhesive material 60, 61 interposed between adjacent turns of the respective metal tapes 62 and 63 are squeezed out while the outer turns of the metal tapes are deformed to conform to the sleeved end 66 with the result that an extremely solid gas- and liquid-tight connection is formed between the sleeved end 66 and the aluminum sheaths 55 and 56.

The other sleeved end 66' is clamped to collapse against the adhesive layer by a contractor not shown. On this occasion, it is also desirable that two outwardly raised ridges 73' and 74' are formed in diametrically opposed relation to each other. The raised ridges 73' and 74' are formed with through apertures 75–76 and 77–78, respectively, and clamped by means of bolts 79, 80 and nuts 81, 82 to complete the sheath jointing.

Having fully described several applications of the present invention to the jointing of aluminum-sheathed cables, it is to be noted that, though the metal tape employed in the inventive method to form a composite adhesive layer desirably takes the form of a thin aluminum tape, it may be formed of copper, iron, lead, tin or any alloy thereof as long as the tape is extremely thin. The thickness of the metal tape is preferably from 0.05 mm. to 0.3 mm., and most suitably 0.1 mm.

The cold-setting synthetic resin adhesive material employed in the inventive method to form an adhesive layer is preferably of the nature that upon hardening no or little gas is produced, and that its hardening reaction is only slightly exothermic and involves no substantial shrinkage. Some examples of synthetic material meeting those requirements are epoxy resins, polyester resins, and polyamide resins. The preferred viscosity of the resin used is from 4 to 300 poises at 25° C. and most suitably from 40 to 150 poises.

As apparent from the foregoing description, the inventive method includes fitting a sleeve over the end portion of the sheath of aluminum-sheathed cables with an adhesive layer interposed therebetween, and which adhesive layer is not formed simply of a coating or coatings of an adhesive material but is formed by wrapping a metal tape together with a layer of a cold-setting synthetic resin adhesive material. Therefore, the outer diameter of the adhesive layer may be controlled over a considerably wide range simply by increasing or decreasing the number of turns of the metal tape. This means that in practicing the present invention the sleeve or junction box used is only required to be furnished in a limited number of sizes as expressed in the inner diametrical dimension of the sleeve to accommodate the desired size range of sheathed cables. It will also be appreciated that the sheath joint obtained by the inventive method is made fully gas- and liquid-tight not only when an integral cylindrical sleeve is employed but also when an axially split sleeve is employed since even in the latter case the inner turns of the metal tape conform to the periphery of the aluminum sheath while the outer turns substantially conform to the cross-sectional configuration of the split sleeve as illustrated FIG. 2. For the same reason, it will also be appreciated that the gas- and liquid-tight characteristics of the sheath joint formed according to the present invention will never be impaired when the sleeve ends are contracted irrespective of whether such contraction is effected uniformly about the periphery thereof as illustrated in FIG. 4 or in a manner such as to form outwardly raised longitudinal ridges in diametrally opposite relation to each other as illustrated in FIG. 7.

The sheath joint of aluminum-sheathed cables obtained by the inventive method has different advantageous features as summarized below.

(1) The sheath joint can withstand a tension as well as a compression of a magnitude greater than that which the cable sheath itself can normally withstand.

(2) The sheath joint has a fluid tightness such as to fully withstand a pressure up to 20 kg./cm.$^2$.

(3) The sheath joint has a high performance which is never impaired even when it is bent at its neck area as many as five times to a radius of 20D (D representing the diameter of the cable).

(4) Because of the presence of a metal tape between each of the jointed sheath and the sleeve or junction box, the contact resistance occurring between the sheaths is effectively held between approximately 0.4 and 1.0 milliohm, substantially eliminating the need of arranging any bridging conductor therebetween.

Figure 2:
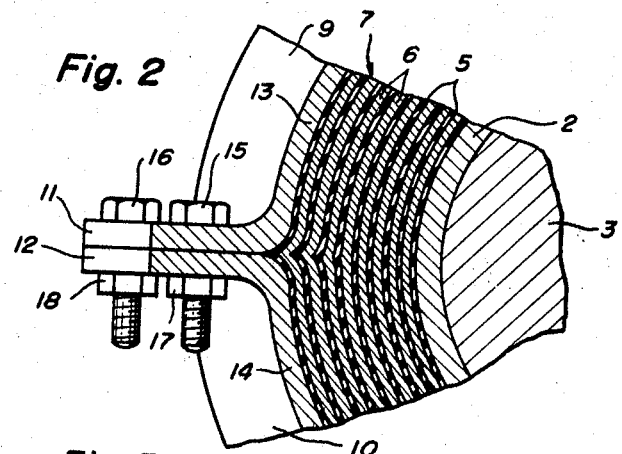
FIG. 2 is an enlarged fragmentary transverse cross-section taken along the line II–II' in FIG. 1.

In the embodiments shown in FIGS. 1, 4 and 5, the ends of the sleeves are fitted on the cable sheath through the adhering layers and thus the joined portions are mechanically secured without the necessity of waiting for the solidifying of the layers and therefore the next steps may be started immediately.

Having described the invention in connection with its application to the jointing of sheaths of aluminum-sheathed cables to a junction or terminal box, it is to be noted that the present invention is never limited to such application but can be applied widely to the connection of aluminum-sheathed cables to various electrical devices which employs a sleeve into which a sheath or sheaths are to be inserted for jointing therewith, and thus the invention is of the full scope of the appended claims.

I claim:

1. A method of jointing sheaths of metal-sheathed cables in gas- and liquid-tight fashion comprising the steps of wrapping the end portions of each of the metal sheaths of the cables to be jointed with composite layers of a metal tape coated with a cold-setting synthetic resin adhesive material, positioning the sleeves of a junction box over the composite layers on respective cable end portions, contracting said sleeves into contact with the respective composite layers, and allowing said adhesive to harden.

2. A method of jointing sheaths of metal-sheathed cables in gas- and liquid-tight fashion comprising the steps of wrapping the end portions of each of the metal sheaths of the cables to be jointed with composite layers of a metal tape while simultaneously coating said metal tape with a cold-setting synthetic resin adhesive material, positioning the sleeves of a junction box over the composite layers on respective cable end portions, contracting said sleeves into contact with the respective composite layers, and allowing said adhesive to harden.

3. A method of jointing sheaths of metal-sheathed cables in gas- and liquid-tight fashion comprising the steps of wrapping the end portions of each of the metal sheaths of the cables to be jointed with composite layers of a metal tape coated with a cold-setting synthetic resin adhesive material, coating the outer periphery of the end portions of said aluminum sheaths of the cables to be jointed with said adhesive material, positioning the sleeves of a junction box over the composite layers on respective cable end portions, contracting said sleeves into contact with the respective composite layers, and allowing said adhesive to harden.

4. A method of jointing sheaths of metal-sheathed cables in gas- and liquid-tight fashion comprising the steps of wrapping the end portions of each of the metal sheaths of the cables to be jointed with composite layers of a metal tape coated with a cold-setting synthetic resin adhesive material, positioning the sleeves of a junction box over the composite layers on respective cable end portions, coating the inner peripheral surfaces of said sleeves with said adhesive material, contracting said sleeves into contact with the respective composite layers, and allowing said adhesive to harden.

5. A method of jointing sheaths of metal-sheathed cables in gas- and liquid-tight fashion comprising the steps of wrapping the end portions of each of the metal sheaths of the cables to be jointed with composite layers of a metal tape coated with a cold-setting synthetic resin adhesive material, positioning the sleeves of a junction box over the composite layers on respective cable end portions, contracting said sleeves into contact with the respective composite layers so as to form along the outside thereof at least one outwardly raised longitudinally extending ridge clamped from the opposite sides thereof, and allowing said adhesive to harden.

6. A method of jointing sheaths of metal sheath cables cables in gas- and liquid-tight fashion comprising the steps of wrapping the end portions of each of the metal sheaths of the cables to be jointed with composite layers of a metal tape coated with a cold-setting synthetic resin adhesive material, positioning the sleeves of a junction box over the composite layers on respective cable end portions with one sleeve accommodating at least two cable end portions and the other sleeve accommodating at least one cable end portion, contracting said sleeves into contact with the respective composite layers so that two outwardly raised longitudinally extending ridges are formed on the outside of said sleeves in a plane including the axes of all of said cables, said ridges being clamped from the opposite sides thereof, and allowing said adhesive to harden.

7. A method as defined by claim 6 wherein said raised ridges on one of said sleeves are formed with through apertures and clamped by means of bolts and nuts.

8. A method as defined by claim 6 wherein the longitudinally extending ridge formed on the outside of the sleeve accommodating said two cables are clamped by means of a clamping attachment.

9. A method of jointing sheaths of metal-sheathed cables in gas- and liquid-tight fashion comprising the steps of wrapping the end portions of each of the metal sheaths of the cables to be jointed with composite layers of metal tape coated with a cold-setting synthetic resin adhesive material, positioning the sleeves of a junction box including a terminal box over the composite layers and respective cable end portions, contracting said sleeves into contact with the respective composite layers, and allowing said adhesive to harden.

10. A method of jointing sheaths of metal-sheathed cables in gas- and liquid-tight fashion comprising the steps of removing the metal sheaths of the cables to be jointed adjacent to the ends thereof to expose the cable cores, splicing the cable cores to form a core joint, wrapping the end portions of the cable sheaths remaining on respective cables with metal tapes coated with a cold-setting synthetic resin adhesive to form a plurality of composite adhesive layers, coating the inner surface of sleeves of a junction box with said resin adhesive, positioning said junction box with the sleeves adjacent respective composite layers on the cable end portions, contracting said sleeves into contact with the respective composite layers, and allowing said adhesive to harden.

References Cited

UNITED STATES PATENTS

| 2,106,850 | 2/1938 | McCulloch | 156—53 |
| 2,463,231 | 3/1949 | Wyatt | 156—49 |
| 2,509,929 | 5/1950 | Kleinfelder | 156—53 |

EARL M. BERGERT, *Primary Examiner.*

T. R. SAVOIE, *Assistant Examiner.*

U.S. Cl. X.R.

174—21, 85, 91, 92